(12) United States Patent
Crowley

(10) Patent No.: US 6,590,765 B2
(45) Date of Patent: Jul. 8, 2003

(54) COMPUTER HOUSING WITH EXPANSION BAY COVER AND METHODS FOR OPERATING EXPANSION BAY COVERS

(75) Inventor: Tom Crowley, Meridian, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 10/118,582

(22) Filed: Apr. 8, 2002

(65) Prior Publication Data

US 2002/0109966 A1 Aug. 15, 2002

Related U.S. Application Data

(62) Division of application No. 09/505,599, filed on Feb. 16, 2000.

(51) Int. Cl.$^7$ .............................. H05K 5/03; H05K 5/02
(52) U.S. Cl. .................. 361/683; 361/685; 361/686; 312/223.2; 312/293.2
(58) Field of Search ............................. 361/683–686, 361/679, 724–727; 49/404; 312/293.1, 293.2, 293.3, 330.1, 223.3, 306, 223.1, 223.2

(56) References Cited

U.S. PATENT DOCUMENTS

| | | | | |
|---|---|---|---|---|
| 3,651,979 A | * | 3/1972 | Severson | 220/41 |
| 3,851,939 A | * | 12/1974 | Benasutti et al. | 312/138 R |
| 4,804,238 A | * | 2/1989 | Bischof et al. | 312/138 R |
| 4,976,502 A | * | 12/1990 | Kelley et al. | 312/322 |
| 4,997,103 A | * | 3/1991 | Daly | 220/346 |
| 5,083,847 A | * | 1/1992 | Peters | 312/322 |
| 5,116,261 A | * | 5/1992 | Lan et al. | 312/292 |
| 5,169,218 A | * | 12/1992 | Chu | 312/223.2 |
| 5,277,309 A | * | 1/1994 | Shteynberg | 206/45.15 |
| 5,372,175 A | * | 12/1994 | Calhoun et al. | 160/235 |
| 5,395,165 A | * | 3/1995 | Woerner | 312/110 |
| 5,495,389 A | * | 2/1996 | Dewitt et al. | 361/683 |
| 5,781,408 A | * | 7/1998 | Crane, Jr. et al. | 361/683 |
| 5,815,379 A | * | 9/1998 | Mundt | 361/683 |
| 5,816,672 A | * | 10/1998 | LaPointe et al. | 312/223.2 |
| 5,924,782 A | * | 7/1999 | Park | 312/328 |
| 6,037,727 A | * | 3/2000 | Kawanobe et al. | 318/286 |
| 6,076,906 A | * | 6/2000 | Royal | 312/273 |
| 6,125,031 A | * | 9/2000 | Della Fiora et al. | 361/683 |
| 6,130,822 A | * | 10/2000 | Della Fiora et al. | 361/724 |

* cited by examiner

Primary Examiner—Anatoly Vortman
(74) Attorney, Agent, or Firm—Perkins Coie LLP

(57) ABSTRACT

Computer housings with retractable expansion bay covers and methods for operating expansion bay covers. In one embodiment, a computer housing includes casing, a front bezel attached to the casing, and a retractable cover system attached to the casing and/or the front bezel. In one embodiment, the casing can have a side structure with a first side and a second side, and a front structure spanning across a front portion of the side structure. The front structure generally has a plurality of permanent drive bays and at least one expansion bay, and the front bezel generally has an opening for each permanent drive bay and an aperture for the expansion bays. The retractable cover system is slidably attached to the casing and/or the front bezel to selectively cover the expansion bay aperture. The cover system can include an internal track in the front bezel or along the side structure and a movable cover having a nub received in the track. The cover slides between a first position in it closes the expansion bay aperture and a second position in which it is retracted into the front bezel and/or the frame to open the expansion bay aperture.

11 Claims, 7 Drawing Sheets

COMPUTER HOUSING WITH EXPANSION BAY COVER AND METHODS FOR OPERATING EXPANSION BAY COVERS

CROSS-REFERENCE TO RELATED APPLICATION

This application is a divisional of pending U.S. patent application Ser. No. 09/505,599, filed on Feb. 16, 2000.

TECHNICAL FIELD

The present invention relates to computers, and more specifically to housings for computers with retractable covers for protecting expansion bays at the front of the housings.

BACKGROUND OF THE INVENTION

Computers have external housings that protect the delicate and sophisticated electronic and optical components in most desktop and laptop computers. The housings generally have a metal chassis and a plastic cover around the chassis. Several computer components, such as control boards, power supplies, hard disk drives and fans, are enclosed by the housing. Other computer components, such as CD ROMS and floppy disk drives, are accessible to a user through openings in the housing. Most computers also have at least one expansion bay for receiving zip-drives, tape backup drives and other expansion components that customize a computer for a specific user.

The expansion bays are typically protected by detachable covers that snap into the housing. Although snap-type covers protect the computers from inadvertently inserting foreign objects in the expansion bays, these covers are easily misplaced after they have been detached from the housing. Snap-type covers can also be easily damaged because they generally have plastic connectors that may break if the covers are twisted as they are detached from the housing. As such, snap-type covers may be lost or broken over the life of the computer.

Another type of cover is a pivoting door that rotates from a closed position to an open position. In the closed position, the pivoting door is the generally flush with the front panel of the housing. But, in the open position, the pivoting door projects outwardly from the front panel for almost the full length of the door. Such pivoting doors may be broken or otherwise detached from the housing in the open position because users are apt to inadvertently bump or strike the doors while moving in front of the computer. Therefore, existing pivoting door-type expansion bay covers may be easily broken.

SUMMARY OF THE INVENTION

The present invention is directed toward computer housings with retractable covers for covering expansion bays or other openings. In one embodiment, a computer housing includes a casing, a front bezel attached to the casing, and a retractable cover system attached to the casing and/or the front bezel. The casing can have a side structure with a first side and a second side, and a front structure spanning across a front portion of the side structure. The front structure generally has a plurality of permanent drive bays and at least one expansion bay. The front bezel generally has a plurality of openings that fit over the permanent drive bays and at least one expansion bay aperture for the expansion bay.

The retractable cover system is slidably attached to the casing and/or the front bezel to selectively cover the expansion bay aperture. The cover system, for example, can include an internal track in the front bezel and/or along the side structure. The cover system can also include a movable cover that slides between a first position and a second position. In the first position, the cover closes the expansion bay aperture. In the second position, the cover is received within one of the front bezel or the casing to open the expansion bay aperture. The cover, for example, can be a panel, a flexible sheet or other types of doors having a first edge with a first nub and a second edge with a second nub. The first and second nubs can be slidably received in the track to slide between the first and second positions. The retractable cover system can also include a securing element attached to the front bezel to releasably hold the cover in the second position.

The internal track can have several configurations. In one embodiment, the track includes a first rail with an elongated first groove and a second rail with an elongated second groove. The first rail can extend rearwardly from the front bezel along the first side of the casing, and the second rail can extend rearwardly from the front bezel along the second side of the casing. The first groove generally faces the second groove across a gap between the first and second sides of the casing. In this embodiment, the rails each include a pivot recess proximate to the front bezel. The nubs of the cover are received in the pivot recesses when the cover is in the first position, and the nubs are received within the groove of the rail when the cover is in the second position. In operation, the cover is generally coplanar with the front bezel in the first position, but the cover is retracted within the casing or the front bezel in the second position.

DETAILED DESCRIPTION

The following disclosure provides a detailed description of several embodiments of computers having housings including retractable cover systems in accordance with the invention. FIGS. 1–7 and the following detailed description set forth several specific details of the invention to provide a thorough understanding of particular embodiments of the invention. The following description also provides examples of preferred embodiments of computer housings in accordance with the invention. One skilled in the art, however, will understand that the present invention may have additional embodiments, or that other embodiments of the invention may be practiced without several of the specific features described in this section.

Figure 1:
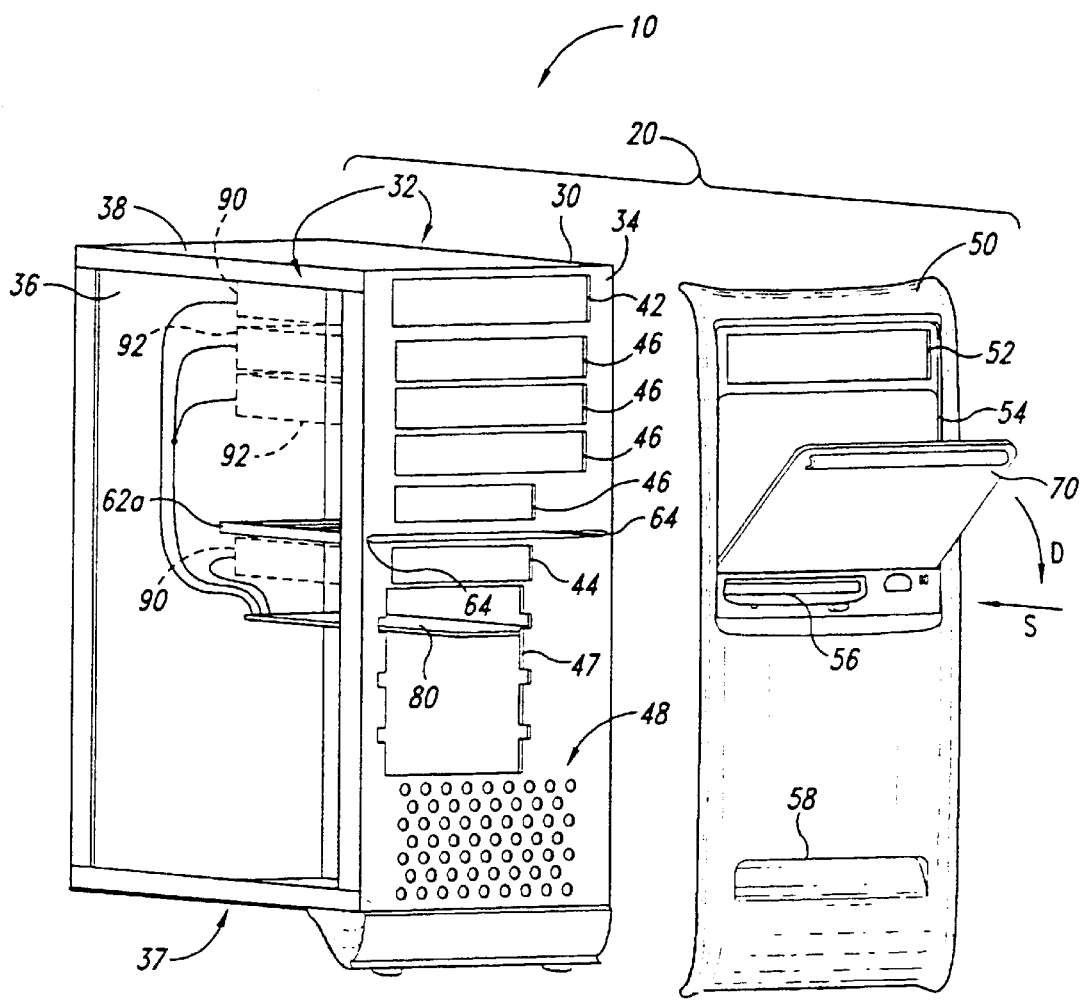
FIG. 1 is an exploded isometric view of a computer having a housing including a retractable cover system in accordance with one embodiment of the invention.

FIG. 1 is an exploded isometric view illustrating a computer 10 having a housing 20 in accordance with one embodiment of the invention. The housing 20 can include a casing 30, a front bezel 50 attached to the casing 30, and a retractable cover system having a movable cover 70 slidably attached to the housing 20. The computer 10 also includes a number of internal components 80 (shown schematically), accessible components 90 (shown schematically) and expansion components 92 (shown schematically). The internal components 80 generally include a processor, random memory devices, hard disk memory devices, power supplies, cooling units and many other devices. The accessible components 90 are generally accessible to users. For example, the accessible components can include a CD ROM drive and a floppy disk drive. The expansion components 92 are generally optional components that are added to the computer 10 according to the particular configuration of a user. The expansion components 92 can include a zip drive, a tape-backup drive, or another type of add-on device. In operation, the cover 70 moves between a first position in which it covers the expansion components 92 and a second position in which it is received within the housing 20. The cover 70 accordingly remains attached to the housing 20, but it does not project significantly beyond the casing 30 or the front bezel 50 when it is in the second position.

The casing 30 can include a first side 32a, a second side 32b, and a front structure 34 spanning across a front portion of the first and second sides 32a and 32b. In the particular embodiment shown in FIG. 1, the first side 32a and the second side 32b collectively define a side structure 32. The first and second sides 32a and 32b can be panels or they can be frames that are covered by separate panels. The casing 30 can further include a back structure 36, a bottom structure 37 and a top structure 38. The casing 30 can have a generally rectilinear configuration, or the casing 30 can have a rounded configuration in which the side structure 32, the rear structure 36 and the top structure 38 have a curved configuration. The casing 30 is generally made from sheetmetal, hard plastics and/or other suitable materials to protect the internal components 80, the accessible components 90 and the expansion components 92.

In the embodiment shown in FIG. 1, the front portion 34 is a panel having a first permanent drive bay 42 for a CD ROM drive, a second permanent drive bay 44 for a floppy disk drive, and a plurality of expansion bays 46 for the expansion components 92. The front portion 34 can also include additional openings 47 and vents 48.

The front bezel 50 shown in FIG. 1 is an aesthetic panel attached to the front portion 34 of the casing 30. The front bezel 50 generally includes a first opening 52 aligned with the first permanent drive bay 42, an expansion bay aperture 54 aligned with the expansion bays 46, and a second opening 56 aligned with the second permanent drive bay 44. The front bezel 50 can further include a hole 58 aligned with the vents 48 of the casing 30. As explained in more detail below, the cover 70 can pivot downwardly (Arrow "D") to open the expansion bay aperture 54, and then the cover 70 can slide (Arrow "S") into the casing 30 to protect the cover 70 while the expansion bay aperture 54 is open.

Figure 2A:
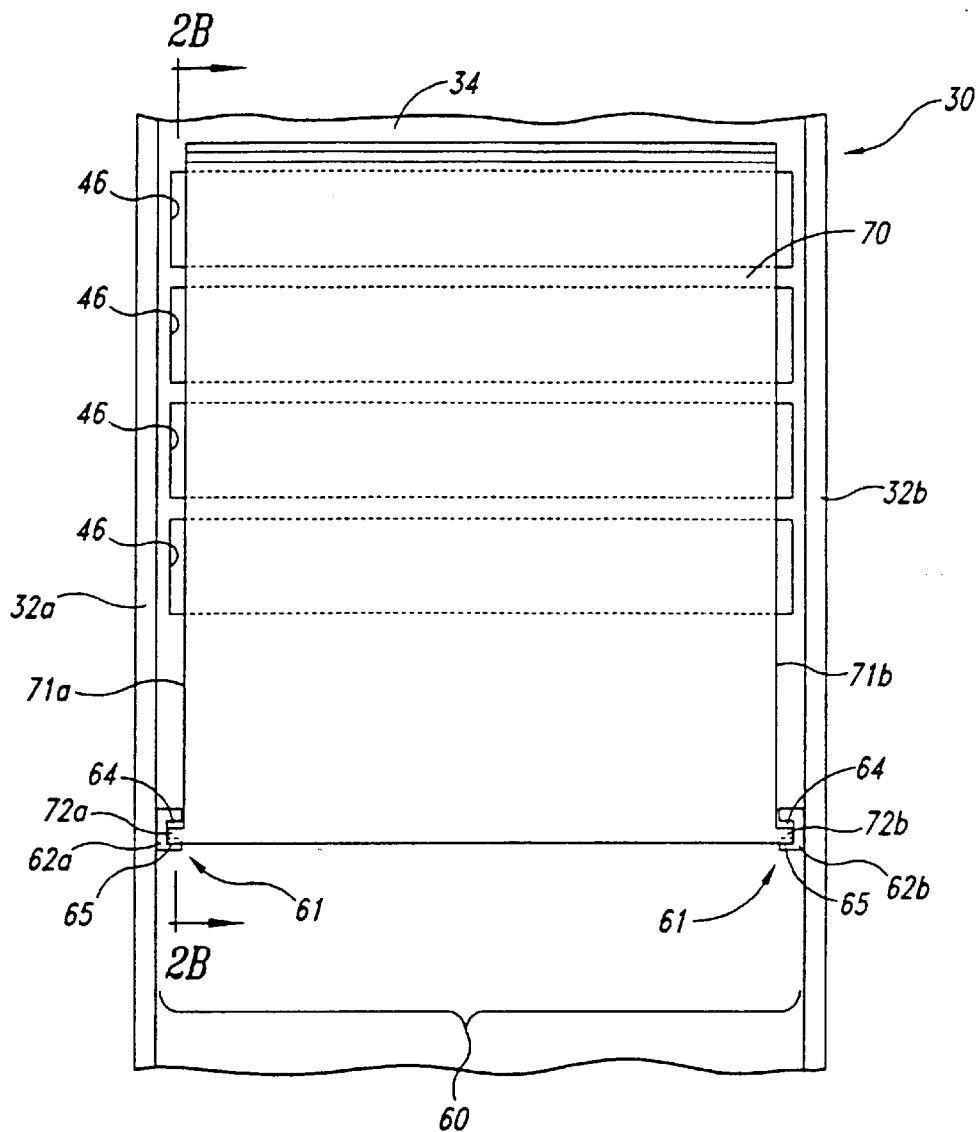
FIG. 2A is a front elevational view illustrating a portion of a housing having a retractable cover system in accordance with one embodiment of the invention.
Figure 2B:
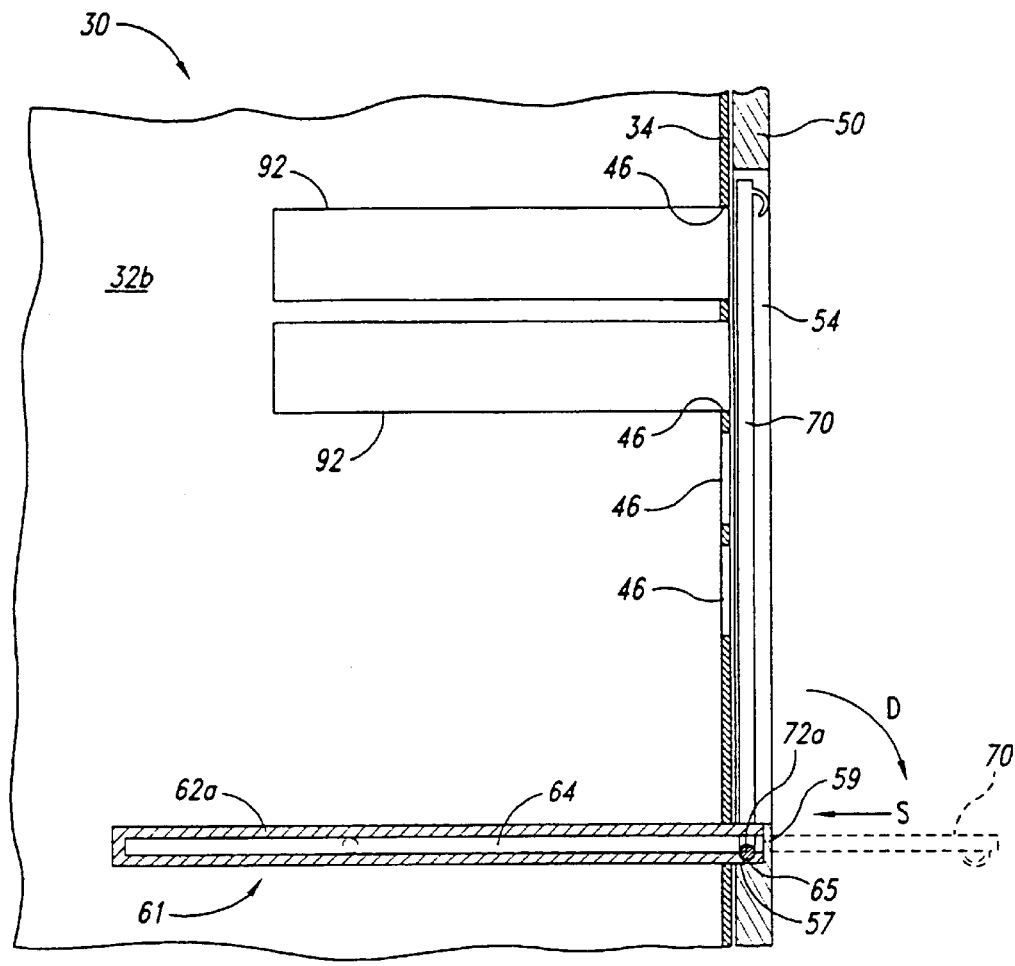
FIG. 2B is a cross-sectional side view illustrating a portion of a housing having the retractable cover system of FIG. 2A taken along line 2A—2A.

FIG. 2A is a front elevational view and FIG. 2B is a side cross-sectional view of a retractable cover system 60 in accordance with one embodiment of the invention. This embodiment of the retractable cover system 60 includes the cover 70 and a track 61 extending into the casing 30. The cover 70 has a first side edge 71a and a second side edge 71b (FIG. 2A). The first and second sides 71a and 71b are spaced apart from one another so that the cover 70 can pass through the expansion bay aperture 54 in the front bezel 50. The cover 70 also has a first nub 72a projecting from the first side 71a and a second nub 72b (shown only in FIG. 2A) projecting from the second side 71b. The first and second nubs 72a and 72b are collectively referred to herein as nubs 72.

The track 61 can include a first rail 62a and a second rail 62b extending rearwardly from the front bezel 50 into the casing 30. The first and second rails 62a and 62b are collectively referred to herein as rails 62. In one embodiment, the first rail 62a is attached to the first side 32a and the second rail 62b is attached to the second side 32b. Referring to FIG. 2B, the front bezel 50 can have a notch 57 to receive the forward end of each rail 62 and a thin facing 59 covering the outer face of each rail 62. Each rail 62 also has a recess 65 to receive a portion of a nub 72. As shown in FIG. 2B, for example, the recess 65 in the first rail 62a receives the first nub 72a so that the cover 70 can pivot downwardly. The rails 62 can be attached to the casing 30 by spot welds, fasteners (e.g., screws or bolts) or adhesives.

Figure 3:
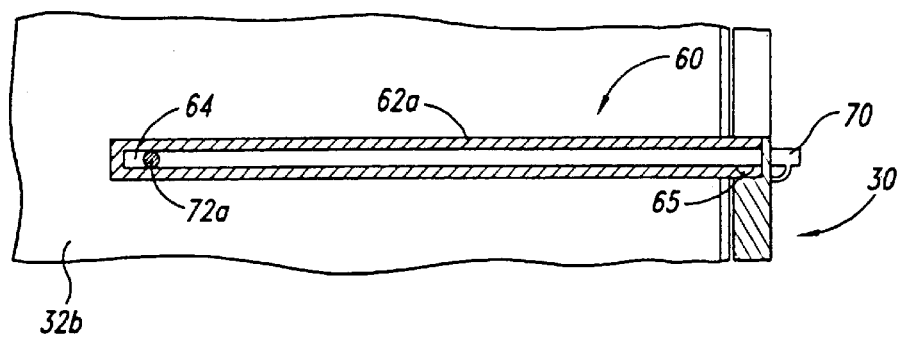
FIG. 3 is a cross-sectional side view illustrating a portion of the retractable cover system of FIG. 2B in a retracted position.

The operation of the retractable cover system 60 is best illustrated in FIGS. 2B and 3. Referring to FIG. 2B, the cover 70 is shown in the first position in which it closes the expansion bay aperture 54 in the front bezel 50 to cover the expansion bays 46 in the front portion 34 of the casing 30. The nubs 72 rest in the recesses 65 of the rails 62 to hold the lower portion of the cover 70 in the first position. To access the expansion components 92 or the expansion bays 46, the cover 70 is opened by rotating the cover 70 downwardly (Arrow D) to an intermediate position (shown in phantom), and then the cover is retracted into the casing 30 by sliding the cover 70 along the rails 62 (Arrow S). The nubs 72 accordingly rotate within the recesses 65 as the cover 70 rotates downwardly, and then the nubs 72 slide along the elongated groves 64 until the cover 70 is received within the casing 30. FIG. 3 illustrates the cover 70 in the second position in which it is received within the casing 30.

The embodiments of the retractable cover system 60 illustrated in FIGS. 2A–3 provide easy and fast access to the expansion bays 46 and the expansion components 92. The expansion bays 46, for example, can be quickly opened for installing or removing expansion components 92 from the computer 10 by merely pivoting the cover 70 downwardly and then retracting the cover 70 into the casing 30. Additionally, after using the expansion components 92, the expansion bays 46 and the expansion components 92 can be quickly protected by sliding the cover 70 outwardly until the nubs 72 drop into the recess 65, and then rotating the cover 70 upwardly to close the expansion bay aperture 54. Therefore, the retractable cover system 60 provides easy and quick manipulation of the expansion bays 46 and the expansion components 92.

The embodiments of the retractable cover system 60 illustrated in FIGS. 2A–3 are also expected to prevent the cover 70 from being lost or damaged. The cover 70 is connected to the casing 30 and the front bezel 50 so that it can be opened and closed without detaching the cover 70 from the computer 10. As a result, it is unlikely that the cover 70 will be lost when the expansion bay aperture 54 is opened. Additionally, the cover 70 retracts into the casing 30 so that only a small portion of the cover 70 projects beyond the front bezel 50. The cover 70 is accordingly unlikely to be broken or otherwise damaged in the open position. Therefore, the embodiments of the retractable cover system 60 shown in FIGS. 2A–3 are expected to prevent damage to, or misplacement of, the cover 70.

Figure 4:
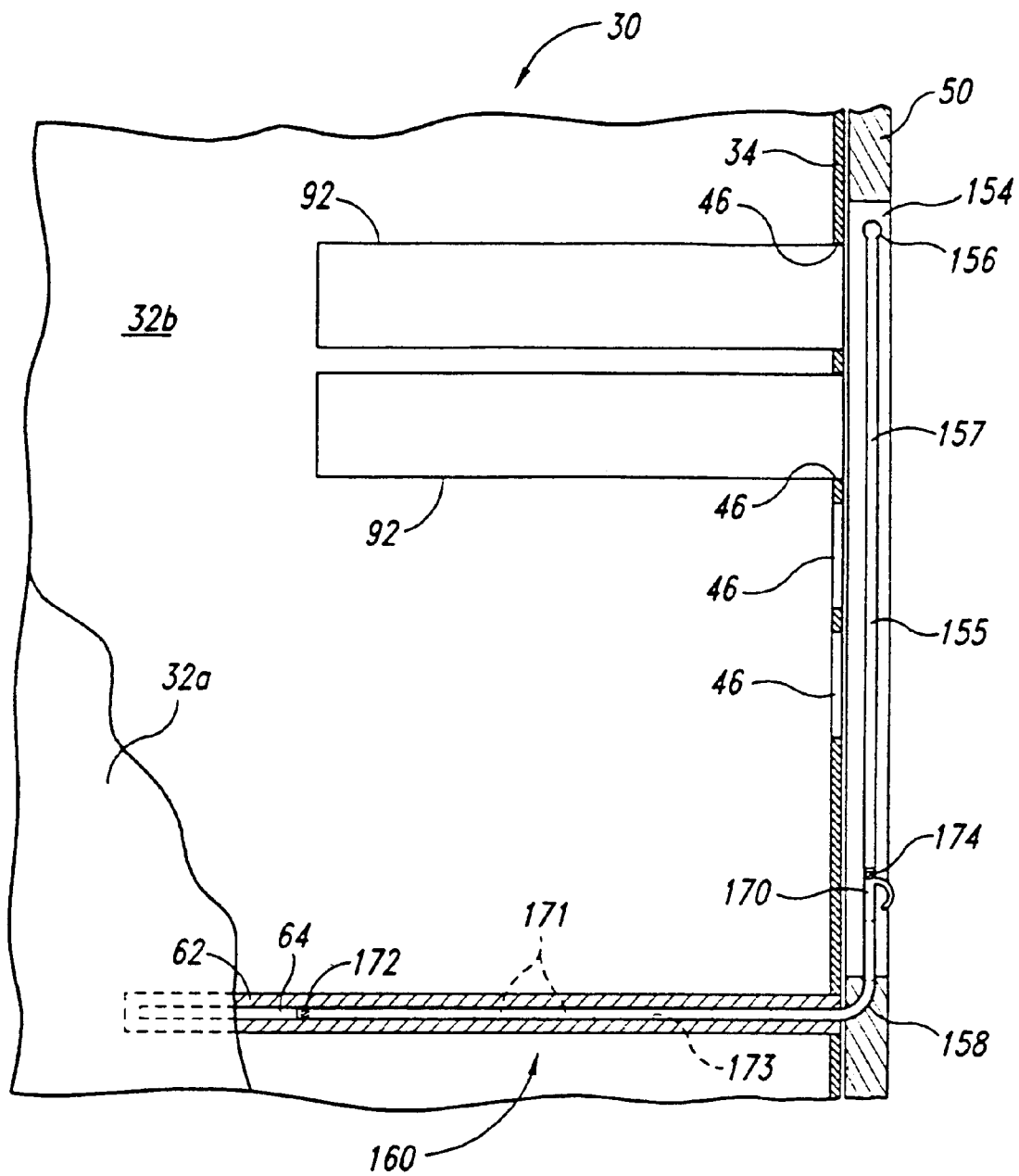
FIG. 4 is a cross-sectional side view illustrating a portion of computer housing having a retractable cover system in accordance with another embodiment of the invention.

FIG. 4 is a side cross-sectional view of another retractable cover system 160 in accordance with an embodiment of the invention. In this embodiment, the retractable cover system 160 includes a track having a first rail 62a attached to the first side 32a and a second rail (not shown) attached to the second side 32b similar to the first and second rails 62a and 62b described above with reference to FIGS. 2A and 2B. The retractable cover system 160 further includes an expansion bay aperture 154 in the front bezel 150 including a slot 155 on each side of the aperture (only one shown). Each slot 155 has a securing device 156, a vertical portion 157, and a curved portion 158. The securing device 156 can be a flexible member with a small gap. The curved portion 158 of each slot has one leg aligned with one of the elongated grooves 64 and another leg aligned with a corresponding vertical portion 157 of a slot 155. In this embodiment, the retractable cover system 160 also has a flexible door 170 having a pair of first nubs 172 at the lower end of the cover 170 and a pair of second nubs 174 at the upper end of the cover 170. The cover 170 can be a continuous sheet of a flexible material, or the cover 170 can have a plurality of panels 171 (shown in phantom) that are pivotally joined together at joints 173 (also shown in phantom). In either embodiment, the cover 170 moves from the closed position to the open position by sliding the cover 170 along the elongated grooves 64 and the slots 155. When the cover 170 is in the closed position, the upper nubs 174 are received in the securing device 156 to hold the cover 170 from falling into the rails 62.

Figure 5:
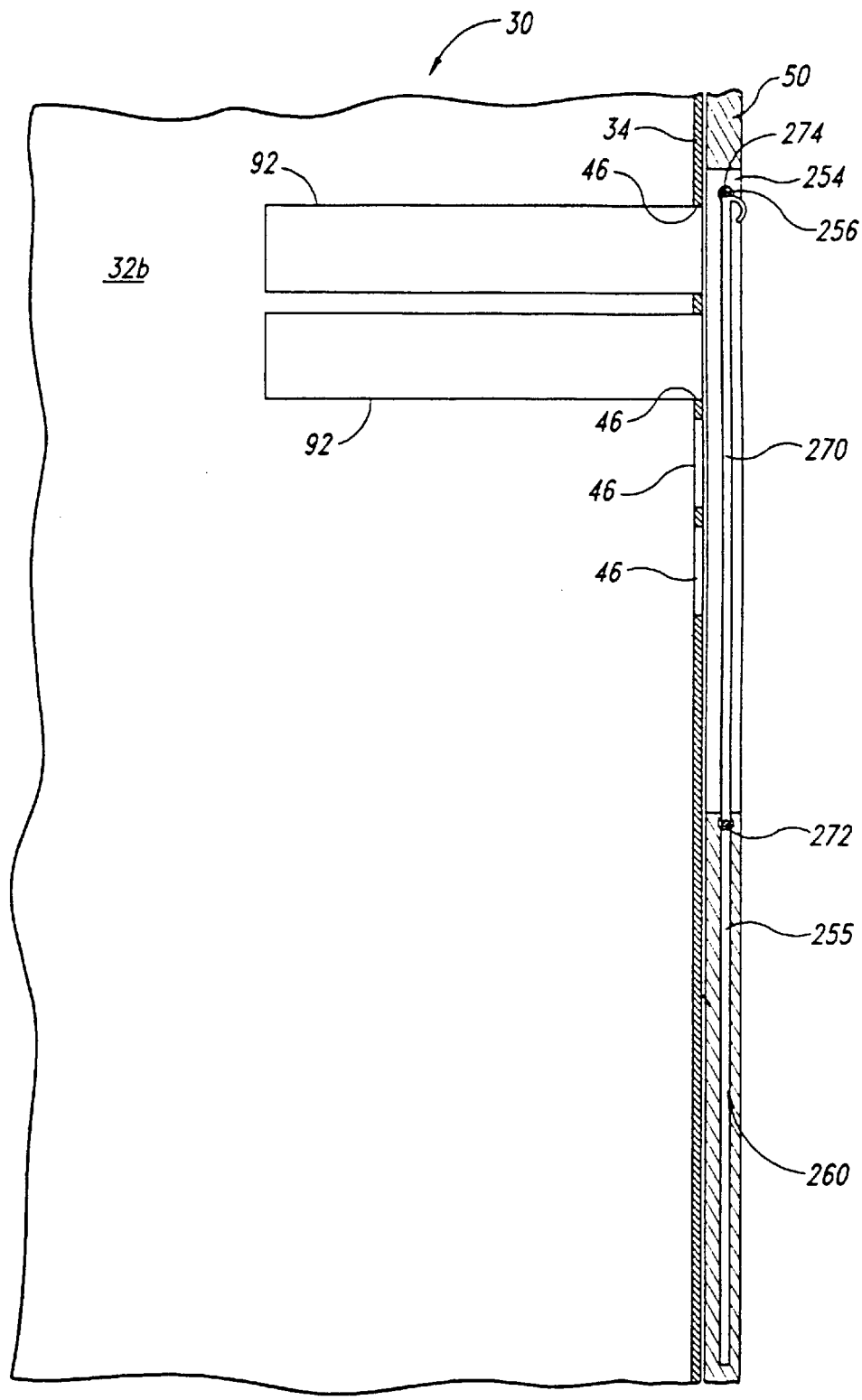
FIG. 5 is a cross-sectional side view illustrating a portion of another computer housing having a retractable cover system in accordance with yet another embodiment of the invention.

FIG. 5 is a side cross-sectional view of a retractable cover system 260 in accordance with yet another embodiment of the invention. In this embodiment, the retractable cover system 260 includes an expansion bay aperture 254 in the front bezel 50 having a slot 255 on each side of the aperture 254 (only one shown) and a securing device 256 at an upper end of each slot 255. The retractable cover system 260 further includes a cover 270 having at least one first guide 272 and at least one second guide 274. The securing device 256 is configured to receive the second guide 274 in a manner that holds the cover 270 to prevent the cover 270 from sliding downwardly within the slots 255. In operation, the cover is moved vertically within the slots 255 between a closed position and an open position.

Figure 6:
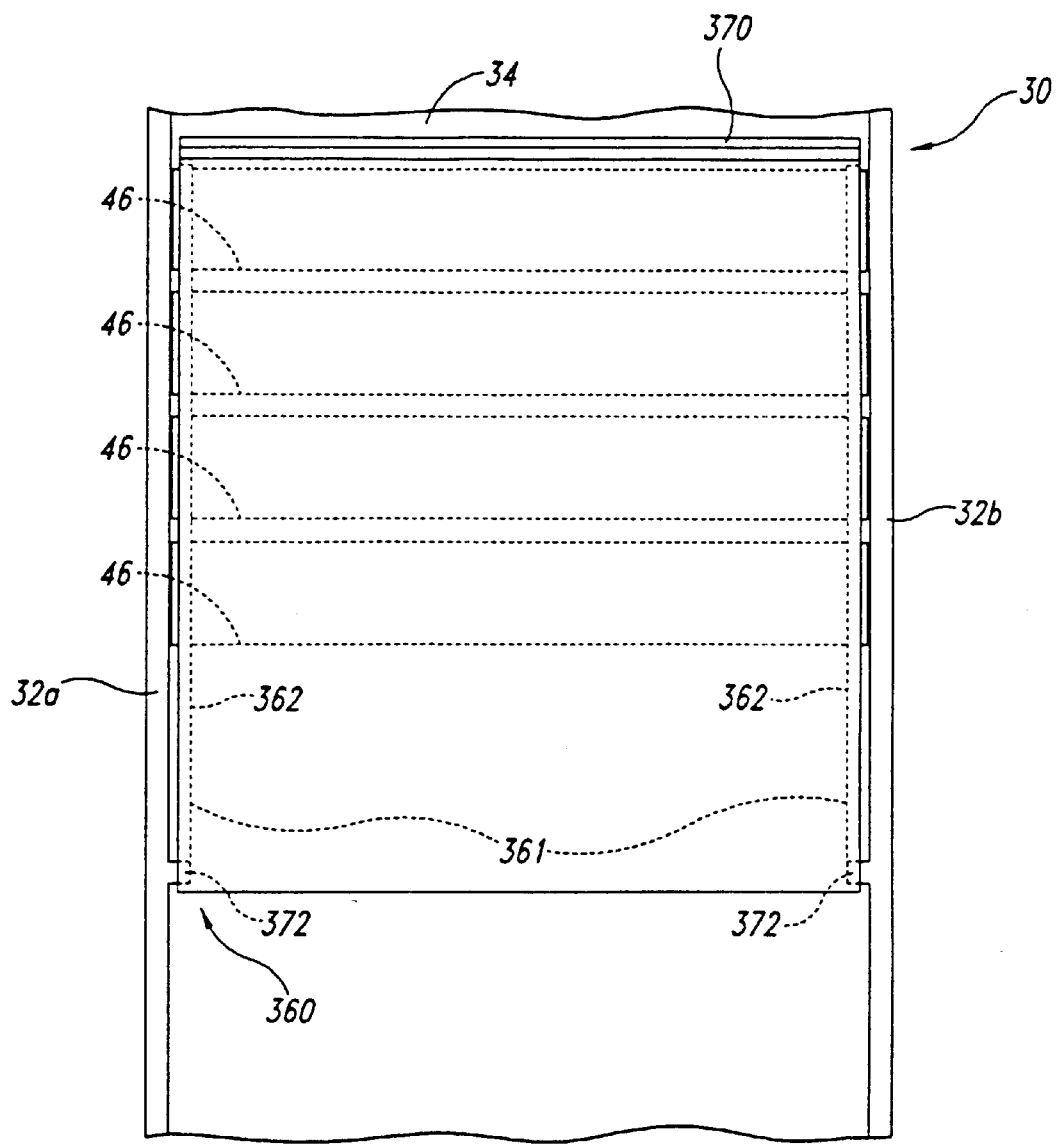
FIG. 6 is a front elevational view illustrating a portion of a computer housing having a retractable cover system in accordance with another embodiment of the invention.

FIG. 6 is a front elevational view illustrating a retractable cover system 360 in accordance with another embodiment of the invention. In this embodiment, the retractable cover system 360 includes a track 361 comprising a groove or slot 362 along the side edges of a cover 370, and a nub 372 projecting from each side 32a and 32b of the casing 30. Each nub 372 is received in a corresponding groove 362 so that the cover 370 can slide along the nubs 372. The cover 370, for example, can be rotated downward and then moved inward into the casing 30. The retractable cover system 360 can accordingly operate in a manner similar to the retractable cover system 60 described above.

Figure 7:
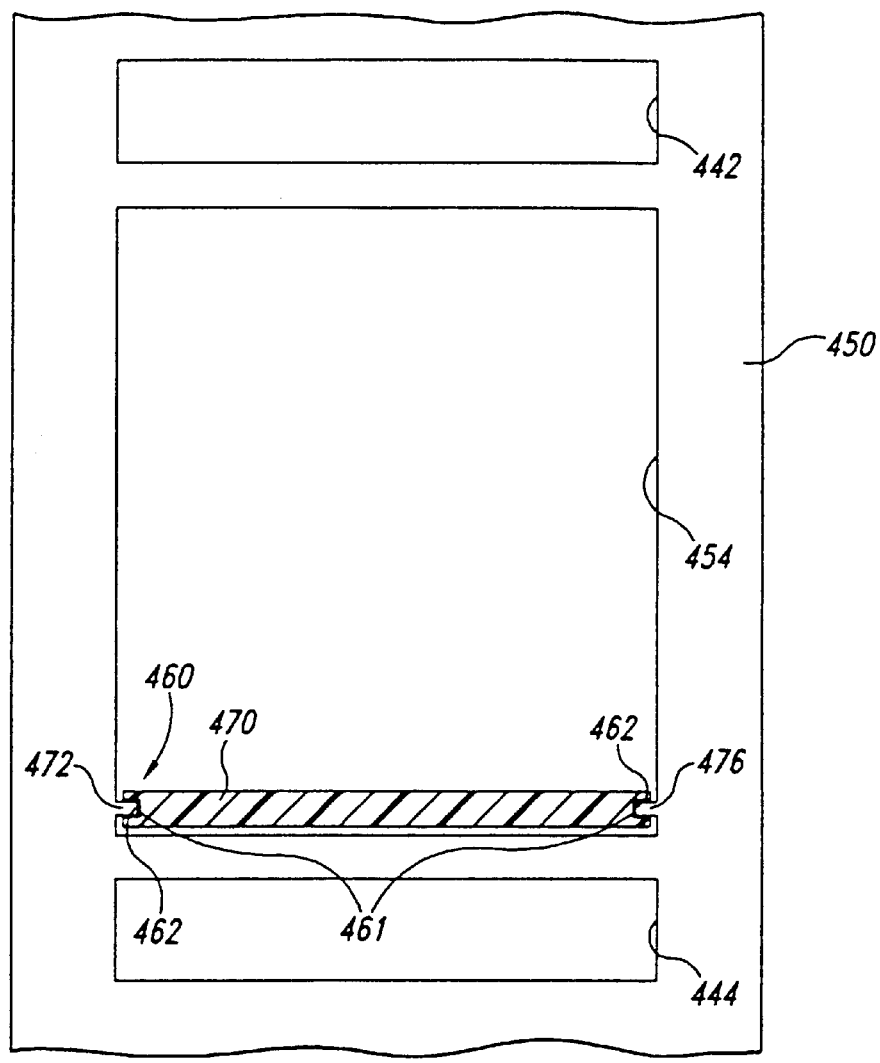
FIG. 7 is a front elevational view illustrating a portion of a computer housing having a retractable cover system in accordance with another embodiment of the invention.

FIG. 7 is a front elevational view illustrating a retractable cover system 460 in accordance with another embodiment of the invention. In this embodiment, the retractable cover system 460 includes a track 461 comprising a groove or slot 462 along the side edges of a cover 470, and a nub 472 projecting from each side of an expansion bay aperture 454 in a front bezel 450. Each nub 472 is received in a corresponding groove 462 so that the cover 470 can slide along the nubs 472. The cover 470, for example, can be rotated downward and then moved inward into the casing behind the front bezel 450. The retractable cover system 360 can accordingly operate in a manner similar to the retractable cover system 60 described above.

From the foregoing, it will be appreciated that although specific embodiments of the computer and the retractable cover system have been described for purposes of illustration, various modifications may be made without deviating from the spirit and scope of the invention. Accordingly, the invention is not limited except by the appended claims.

What is claimed is:

1. A computer housing comprising:

a casing having a side structure with a first side and a second side, and a front structure spanning across a front portion of the side structure, the front structure having a permanent bay and at least one expansion bay;

a shell having a front bezel covering the front structure of the casing and a cover section covering the side structure, the front bezel having a CD ROM opening, a disk drive opening, and an expansion bay aperture;

a retractable cover system slidably attached to the casing and/or the front bezel to selectively cover the expansion bay aperture, the cover system including a nub projecting from either the front bezel into the expansion bay aperture or from the side structure into an internal cavity in the casing, a moveable cover having a track to receive the nub and slide along the nub between a first position in which the cover closes the expansion bay aperture and a second position in which the cover is received within one of the casing or the front bezel to open the expansion bay aperture, wherein the cover includes a flexible sheet having a first side edge and a second side edge, and the track comprises an elongated first groove on the first side edge and an elongated second groove on the second side edge, the first nub being received in the first groove and the second nub being received in the second groove.

2. A computer housing comprising:

a casing having a side structure with a first side and a second side, and a front structure spanning across a front portion of the side structure, the front structure having a permanent bay and at least one expansion bay;

a shell having a front bezel covering the front structure of the casing and a cover section covering the side structure, the front bezel having a CD ROM opening, a disk drive opening, and an expansion bay aperture;

a retractable cover system slidably attached to the casing and/or the front bezel to selectively cover the expansion bay aperture, the cover system including a nub projecting from either the front bezel into the expansion bay aperture or from the side structure into an internal cavity in the casing, a moveable cover having a track to receive the nub and slide along the nub between a first position in which the cover closes the expansion bay aperture and a second position in which the cover is received within one of the casing or the front bezel to open the expansion bay aperture, wherein the cover includes a plurality of rectilinear sections pivotally attached to one another defining a flexible panel having a first side edge and a second side edge, and the track comprises an elongated first groove on the first side edge and an elongated second groove on the second side edge, the first nub being received in the first groove and the second nub being received in the second groove.

3. A computer comprising:
a housing including
- a casing having a side structure with a first side and a second side, and a front structure spanning across a front portion of the side structure, the front structure having a permanent drive bay and at least one expansion bay;
- a front bezel covering the front structure of the casing, the front bezel having an opening for the permanent drive bay and an expansion bay aperture;
- a retractable cover system slidably attached to the casing and/or the front bezel to selectively cover the expansion bay aperture, the cover system including an internal track in the front bezel or along the side structure, a moveable cover having a nub received in the track to slide between a first position in which the cover closes the expansion bay aperture and a second position in which the cover is received within one of the front bezel or the casing to open the expansion bay aperture;
- a control board within the housing, the control board being removably coupled to the casing, and the control board including at least a processor and a memory device operatively coupled to the processor; and
- a permanent drive component removably coupled to the casing in the permanent drive bay, wherein:
  - the track comprises a first rail including an elongated first groove with a first recess at a forward end of the first rail and a second rail including an elongated second groove with a second recess at a forward end of the second rail, the first rail extending rearwardly from the front bezel along the first side of the casing and the second rail extending rearwardly from the front bezel along the second side of the casing, and the first groove facing the second groove across a gap between the first and second sides of the casing;
  - the front bezel includes a first slot on one side of the expansion bay aperture and a second slot on an opposite side of the expansion bay aperture, the first and second slots having a generally vertical section and a curved section, wherein the curved section of the first slot joins the first groove of the first rail and the curved section of the second slot joins the second groove of the second rail; and
  - the cover includes a flexible sheet having a first side with a first nub and a second side with a second nub, the first nub being received within the first groove of the first rail or the first slot, and the second nub being received within the second groove of the second rail or the second slot, wherein the cover is generally coplanar with the front bezel in the first position and the cover is received within the casing in the second position by sliding the nubs along the slots and the rails.

4. A computer comprising:
a housing including
- a casing having a side structure with a first side and a second side, and a front structure spanning across a front portion of the side structure, the front structure having a permanent drive bay and at least one expansion bay;
- a front bezel covering the front structure of the casing, the front bezel having an opening for the permanent drive bay and an expansion bay aperture;
- a retractable cover system slidably attached to the casing and/or the front bezel to selectively cover the expansion bay aperture, the cover system including an internal track in the front bezel or along the side structure, a moveable cover having a nub received in the track to slide between a first position in which the cover closes the expansion bay aperture and a second position in which the cover is received within one of the front bezel or the casing to open the expansion bay aperture;
- a control board within the housing, the control board being removably coupled to the casing, and the control board including at least a processor and a memory device operatively coupled to the processor; and
- a permanent drive component removably coupled to the casing in the permanent drive bay, wherein:
  - the track comprises a first rail including an elongated first groove with a first recess at a forward end of the first rail and a second rail including an elongated second groove with a second recess at a forward end of the second rail, the first rail extending rearwardly from the front bezel along the first side of the casing and the second rail extending rearwardly from the front bezel along the second side of the casing, and the first groove facing the second groove across a gap between the first and second sides of the casing;
  - the front bezel includes a first slot on one side of the expansion bay aperture and a second slot on an opposite side of the expansion bay aperture, the first and second slots having a generally vertical section and a curved section, wherein the curved section of the first slot joins the first groove of the first rail and the curved section of the second slot joins the second groove of the second rail; and
  - the cover includes a plurality of rectilinear sections pivotally attached to one another to define a flexible panel having a first side with a first nub and a second side with a second nub, the first nub being within the first groove of the first rail or the first slot, and the second nub being received within the second groove of the second rail or the second slot, wherein the cover is generally coplanar with the front bezel in the first position and the cover is received within the casing in the second position by sliding the nubs along slots and the rails.

5. A computer comprising:
a housing including
- a casing having a side structure with a first side and a second side, and a front structure spanning across a front portion of the side structure, the front structure having a permanent drive bay and at least one expansion bay;
- a shell having a front bezel covering the front structure of the casing and a cover section covering the side structure, the front bezel having an opening for the permanent drive bay and an expansion bay aperture;
- a retractable cover system slidably attached to the casing and/or the front bezel to selectively cover the expansion bay aperture, the cover system including a nub projecting from either the front bezel into the expansion bay aperture or from the side structure into an internal cavity in the casing, a moveable cover having a track to receive the nub and slide along the nub between a first position in which the cover closes the expansion bay aperture and a second position in which the cover is received within one of the casing or the front bezel to open the expansion bay aperture;

a control board within the housing, the control board being removably coupled to the casing, and the control board including a processor and a memory device operatively coupled to the processor;

a CD ROM drive removably coupled to the casing in the CD ROM bay; and a disk drive removably coupled to the casing in the disk drive bay, wherein the cover includes a flexible sheet having a first side edge and a second side edge, and the track comprises an elongated first groove on the first side edge and an elongated second groove on the second side edge, the first nub being received in the first groove and the second nub being received in the second groove.

6. A computer comprising:

a housing including a casing having a side structure with a first side and a second side, and a front structure spanning across a front portion of the side structure, the front structure having a permanent drive bay and at least one expansion bay;

a shell having a front bezel covering the front structure of the casing and a cover section covering the side structure, the front bezel having an opening for the permanent drive bay and an expansion bay aperture;

a retractable cover system slidably attached to the casing and/or the front bezel to selectively cover the expansion bay aperture, the cover system including a nub projecting from either the front bezel into the expansion bay aperture or from the side structure into an internal cavity in the casing, a moveable cover having a track to receive the nub and slide along the nub between a first position in which the cover closes the expansion bay aperture and a second position in which the cover is received within one of the casing or the front bezel to open the expansion bay aperture;

a control board within the housing, the control board being removably coupled to the casing, and the control board including a processor and a memory device operatively coupled to the processor;

a CD ROM drive removably coupled to the casing in the CD ROM bay; and a disk drive removably coupled to the casing in the disk drive bay, wherein the cover includes a plurality of rectilinear sections pivotally attached to one another defining a flexible panel having a first side edge and a second side edge, and the track comprises an elongated first groove on the first side edge and an elongated second groove on the second side edge, the first nub being received in the first groove and the second nub being received in the second groove.

7. In the operation of a computer, a method of installing a component into an expansion bay of the computer, comprising:

opening an aperture in front of the expansion bay by moving a flexible cover closing the aperture, the flexible cover being moved by sliding the flexible cover vertically along a slot of a front bezel of the computer and rearwardly along a rail carried by a casing behind the front bezel from a closed position, in which the flexible cover closes the aperture, to an open position, in which at least a portion of the flexible cover is received within the casing and extends rearwardly from the front bezel along the rail, wherein the flexible cover bends to follow a curved path from the vertically-extending slot to the rearwardly-extending rail in moving from the closed position to the open position; and inserting a component through the aperture and into the expansion bay.

8. A computer housing comprising:

a casing having a side structure with a first side and a second side, and a front structure spanning across a front portion of the side structure, the front structure having a permanent drive bay and at least one expansion bay;

a front bezel covering the front structure of the casing, the front bezel having an opening for the permanent drive bay, an expansion bay aperture, and a slot proximate the expansion bay aperture, the slot having a generally vertical section and a curved section;

a retractable cover system slidably attached to the casing and/or the front bezel to selectively cover the expansion bay aperture, the cover system including:

a track in the front bezel or along the side structure, the track comprising a rail extending rearwardly from the front bezel and including an elongated groove with a recess at a forward end of the rail, wherein the groove joins the curved section of the slot; and a moveable cover comprising a flexible sheet having a nub received within the groove of the rail or the slot, the nub being adapted to slide along the slot or rail to move the cover between a first position in which the cover is generally coplanar with the front bezel and closes the expansion bay aperture, and a second position in which the cover is received within one of the front bezel or the casing to open the expansion bay aperture.

9. A computer housing comprising:

a casing having a side structure with a first side and a second side, and a front structure spanning across a front portion of the side structure, the front structure having a permanent drive bay and at least one expansion bay;

a front bezel covering the front structure of the casing, the front bezel having an opening for the permanent drive bay, an expansion bay aperture, and a slot proximate the expansion bay aperture, the slot having a generally vertical section and a curved section;

a retractable cover system slidably attached to the casing and/or the front bezel to selectively cover the expansion bay aperture, the cover system including:

a track in the front bezel or along the side structure, the track comprising a rail extending rearwardly from the front bezel and including an elongated groove with a recess at a forward end of the rail, wherein the groove joins the curved section of the slot; and a moveable cover comprising a plurality of rectilinear sections pivotally attached to one another to define a flexible panel having a nub received within the groove of the rail or the slot, the nub being adapted to slide along the slot or rail to move the cover between a first position in which the cover is generally coplanar with the front bezel and closes the expansion bay aperture, and a second position in which the cover is received within one of the front bezel or the casing to open the expansion bay aperture.

10. A computer housing comprising:

a casing having a side structure with a first side and a second side, and a front structure spanning across a front portion of the side structure, the front structure having a permanent drive bay and at least one expansion bay;

a front bezel covering the front structure of the casing, the front bezel having an opening for the permanent drive bay and an expansion bay aperture; and a retractable cover system slidably attached to the casing and/or the front bezel to selectively cover the expansion bay aperture but not the opening for the permanent drive bay, the cover system including an internal track in the front bezel or along the side structure, a moveable cover having a nub received in the track to slide between a first position in which the cover closes the expansion bay aperture and a second position in which the cover is received within one of the front bezel or the casing to open the expansion bay aperture, wherein the track comprises a first rail including an elongated first groove with a first recess at a forward end of the first rail and a second rail including an elongated second groove with a second recess at a forward end of the second rail, the first rail extending rearwardly from the front bezel along the first side of the casing and the second rail extending rearwardly from the front bezel along the second side of the casing, and the first groove facing the second groove across a gap between the first and second sides of the casing;

the front bezel includes a first slot on one side of the expansion bay aperture and a second slot on an opposite side of the expansion bay aperture, the first and second slots having a generally vertical section and a curved section, wherein the curved section of the first slot joins the first groove of the first rail and the curved section of the second slot joins the second groove of the second rail; and the cover includes a flexible sheet having a first side with a first nub and a second side with a second nub, the first nub being received within the first groove of the first rail or the first slot, and the second nub being received within the second groove of the second rail or the second slot, wherein the cover is generally coplanar with the front bezel in the first position and the cover is received within the casing in the second position by sliding the nubs along the slots and the rails.

11. A computer housing comprising:

a casing having a side structure with a first side and a second side, and a front structure spanning across a front portion of the side structure, the front structure having a permanent drive bay and at least one expansion bay;

a front bezel covering the front structure of the casing, the front bezel having an opening for the permanent drive bay and an expansion bay aperture; and a retractable cover system slidably attached to the casing and/or the front bezel to selectively cover the expansion bay aperture but not the opening for the permanent drive bay, the cover system including an internal track in the front bezel or along the side structure, a moveable cover having a nub received in the track to slide between a first position in which the cover closes the expansion bay aperture and a second position in which the cover is received within one of the front bezel or the casing to open the expansion bay aperture, wherein the track comprises a first rail including an elongated first groove with a first recess at a forward end of the first rail and a second rail including an elongated second groove with a second recess at a forward end of the second rail, the first rail extending rearwardly from the front bezel along the first side of the casing and the second rail extending rearwardly from the front bezel along the second side of the casing, and the first groove facing the second groove across a gap between the first and second sides of the casing;

the front bezel includes a first slot on one side of the expansion bay aperture and a second slot on an opposite side of the expansion bay aperture, the first and second slots having a generally vertical section and a curved section, wherein the curved section of the first slot joins the first groove of the first rail and the curved section of the second slot joins the second groove of the second rail; and the cover includes a plurality of rectilinear sections pivotally attached to one another to define a flexible panel having a first side with a first nub and a second side with a second nub, the first nub being received within the first groove of the first rail or the first slot, and the second nub being received within the second groove of the second rail or the second slot, wherein the cover is generally coplanar with the front bezel in the first position and the cover is received within the casing and in the second position by sliding the nubs along slots and the rails.

* * * * *